(12) United States Patent
Hoffmann et al.

(10) Patent No.: US 12,128,725 B2
(45) Date of Patent: Oct. 29, 2024

(54) METHOD FOR SETTING THE LIFT POSITION OF A MACHINE FRAME OF A GROUND MILLING MACHINE, WHICH MACHINE FRAME IS CONNECTED VIA LIFTING MEANS TO MOVEMENT MEANS, AND GROUND MILLING MACHINE

(71) Applicant: BOMAG GMBH, Boppard (DE)

(72) Inventors: André Hoffmann, Boppard (DE); Alice Dupont, Boppard (DE); Rafael Schomaker, Boppard (DE)

(73) Assignee: BOMAG GMBH, Boppard (DE)

( * ) Notice: Subject to any disclaimer, the term of this patent is extended or adjusted under 35 U.S.C. 154(b) by 156 days.

(21) Appl. No.: 17/657,974

(22) Filed: Apr. 5, 2022

(65) Prior Publication Data

US 2022/0314724 A1 Oct. 6, 2022

(30) Foreign Application Priority Data

Apr. 6, 2021 (DE) .................... 10 2021 001 754.4
Jul. 20, 2021 (DE) .................... 10 2021 118 775.3

(51) Int. Cl.
| | | |
|---|---|---|
| *E01C 23/088* | (2006.01) | |
| *B60G 17/015* | (2006.01) | |
| *B60G 17/016* | (2006.01) | |
| *B60G 17/019* | (2006.01) | |

(52) U.S. Cl.
CPC ....... *B60G 17/016* (2013.01); *B60G 17/0152* (2013.01); *B60G 17/01908* (2013.01); *E01C 23/088* (2013.01); *B60G 2300/09* (2013.01); *B60G 2401/14* (2013.01); *B60G 2401/17* (2013.01); *B60G 2401/28* (2013.01)

(58) Field of Classification Search
CPC . E01C 23/088; E01C 19/004; B60G 2300/09; B60G 17/016; B60G 2400/0512; B60G 17/0152; B60G 17/01908; B60G 2401/14; B60G 2401/17; B60G 2401/28
See application file for complete search history.

(56) References Cited

U.S. PATENT DOCUMENTS

| | | | | |
|---|---|---|---|---|
| 5,318,378 | A | * | 6/1994 | Lent ...................... E01C 23/088 404/90 |
| 10,688,901 | B2 | | 6/2020 | Zahr et al. |
| 10,704,211 | B2 | | 7/2020 | Laugwitz |
| 2006/0039757 | A1 | * | 2/2006 | Lemke .................. E01C 23/088 404/94 |
| 2008/0152428 | A1 | | 6/2008 | Berning et al. |
| 2008/0203684 | A1 | | 8/2008 | Berning et al. |

(Continued)

FOREIGN PATENT DOCUMENTS

| | | |
|---|---|---|
| CN | 102304891 | 1/2012 |
| CN | 107226360 | 10/2017 |

(Continued)

OTHER PUBLICATIONS

Office Action from related Chinese Appln. No. 202210353053.6, dated Jul. 15, 2023. English translation attached.

*Primary Examiner* — Carib A Oquendo
(74) *Attorney, Agent, or Firm* — Grossman, Tucker, Perreault & Pfleger, PLLC (57) ABSTRACT

A method for setting the lifting position of a machine frame of a ground milling machine, which machine frame is connected via lifting means to movement means, and to a ground milling machine.

12 Claims, 4 Drawing Sheets

(56) References Cited

U.S. PATENT DOCUMENTS

| | | | |
|---|---|---|---|
| 2010/0109422 A1 | 5/2010 | Busley et al. | |
| 2011/0266858 A1 | 11/2011 | Laux et al. | |
| 2013/0162003 A1* | 6/2013 | Killion | E01C 23/088 299/1.5 |
| 2014/0110990 A1 | 4/2014 | Berning et al. | |
| 2014/0379227 A1* | 12/2014 | Reuter | E01C 23/08 299/1.5 |
| 2015/0284918 A1* | 10/2015 | Fritz | E01C 23/127 299/1.5 |
| 2016/0177522 A1 | 6/2016 | Nacke et al. | |
| 2017/0100981 A1 | 4/2017 | Muir et al. | |
| 2017/0167089 A1* | 6/2017 | Marsolek | G06Q 50/08 |
| 2020/0123716 A1* | 4/2020 | Engelmann | E02F 9/2025 |

FOREIGN PATENT DOCUMENTS

| | | |
|---|---|---|
| CN | 109733492 | 5/2019 |
| CN | 109750580 | 5/2019 |
| CN | 110965442 | 4/2020 |
| DE | 102005044211 | 3/2007 |
| DE | 102006062129 | 7/2008 |
| DE | 102014019168 | 6/2016 |
| DE | 102016119356 | 4/2017 |
| EP | 1855899 | 11/2007 |
| EP | 2722441 | 4/2014 |
| WO | 2021/052945 | 3/2021 |

\* cited by examiner

METHOD FOR SETTING THE LIFT POSITION OF A MACHINE FRAME OF A GROUND MILLING MACHINE, WHICH MACHINE FRAME IS CONNECTED VIA LIFTING MEANS TO MOVEMENT MEANS, AND GROUND MILLING MACHINE

FIELD

The invention relates to a method for setting the lift position of a machine frame of a ground milling machine, which machine frame is connected via lifting means to movement means, and to a ground milling machine, in particular for carrying out the method according to the invention.

BACKGROUND

Ground milling machines of this type are known, for example, from DE102006062129A1, DE102005044211A1, EP1855899B1, EP2722441B1 and DE 102014019168A1. Such ground milling machines are used for milling up the ground surface, for example for milling road surfaces and/or for stabilization and/or recycling measures of the ground surface, and for this purpose have a ground milling means with a milling drum, which is mounted horizontally with its axis of rotation generally transverse to the working device and which, in rotating working operation, mills the ground surface via corresponding working tools arranged on the outer lateral surface of the milling drum. In addition to the ground milling means, such a ground milling machine further comprises a machine frame, which represents the fundamental support structure of the ground milling machine. Furthermore, a pair of front movement means and a pair of rear movement means are usually arranged on the machine frame, wherein movement means are understood here to mean both wheels and crawler tracks. However, a single pair of movement means can in principle also be replaced by a single movement means in a known manner.

In order to enable different height positioning of the machine frame in relation to the ground surface, at least one pair of the front and/or rear movement means is connected to the machine frame via vertically adjustable lifting means, usually comprising an actuator, such as a hydraulically driven cylinder-piston unit. The lifting means are functionally designed in such a way that they can vary the distance between the machine frame and the movement means, in particular at least proportionally in the vertical direction, in order to effect a lifting adjustment in the vertical direction of the machine frame relative to the ground surface. Such a lifting adjustment can be used, for example, at the beginning of a milling process by lowering the ground milling machine to a desired milling depth and/or for orienting the machine frame, for example when driving over obstacles, and/or for lifting the milling means above the ground surface during transport travel. These lifting means can be designed to be linearly adjustable as so-called lifting columns. Furthermore, ground milling machines of the type in question comprise a control device which is designed to control the lifting adjustment of the lifting means by means of the various actuators. One of the main tasks of the control device can be to allow a mutually coordinated adjustment of the actuators or lifting means in order to be able to control, on the one hand, the height adjustment of the construction machine itself and, on the other hand, the position of the machine frame usually in relation to the ground surface.

Especially if all of the existing movement means are height-adjustable relative to the machine frame, the controller of the individual lifting means poses a considerable challenge to the operator, who must simultaneously monitor the other functions of the ground milling machine, such as the milling process itself and the loading process of the milled material, as well as the machine's surroundings.

SUMMARY

Based on this, it is the object of the invention to describe a possibility for relieving the plumb-line operator of a ground milling machine and for increasing the operating comfort of the ground milling machine.

A first aspect of the invention relates to a method for adjusting the lift position of a machine frame of a ground milling machine, which machine frame is connected via lifting means to movement means. The method according to the invention provides for detecting and monitoring an actual longitudinal inclination of the machine frame relative to a plumb-line direction using at least one longitudinal inclination sensor and transmitting the actual longitudinal inclination of the machine frame to a control unit. It is thus essential that the direct or indirect reference of the determination of the longitudinal inclination is in relation to the plumb-line direction, i.e. in particular the local direction of the gravitational acceleration, and thus not in relation to a local reference surface determined by the particular ground surface. According to the invention, the longitudinal inclination of the ground milling machine is thus determined independently of the local conditions in which the ground milling machine is currently located, and in particular also not by detecting the position of a ground level on which the ground milling machine is currently standing. The longitudinal inclination refers here to the inclination of the machine frame in relation to this plumb-line direction in a virtual reference plane, which is defined by the plumb-line direction and the longitudinal extension or the forward travel direction of the ground milling machine.

Furthermore, the definition of a target longitudinal inclination of the machine frame is provided in accordance with the invention. This can be performed manually or also in a manner supported by a control unit, for example in such a way that one or more predefined longitudinal inclination positions of the machine frame are approached in a controlled manner by the control unit when the ground milling machine is started up and/or in certain operating situations. In particular, it can be provided that the operator of the ground milling machine sets a desired position of the machine frame, at least with regard to its longitudinal inclination, and then defines this longitudinal inclination position individually as the target longitudinal inclination by manual control command, for example by actuating an operating element.

If the actual longitudinal inclination deviates from the target longitudinal inclination, controlled updating of the lifting position of the rear or front lifting means by a control unit is provided in accordance with the invention. This can be done, in particular, while the ground milling machine is in running operation. The control is performed in such a way that the actual longitudinal inclination is approximated to the target longitudinal inclination of the machine frame, ideally until the actual longitudinal inclination corresponds to the target longitudinal inclination. This requires a corresponding control loop, the controlled variable of which is the actual longitudinal inclination determined with the aid of the longitudinal inclination sensor and the reference variable of which can be a lift position of the lifting means of front and/or rear movement means, and the actuator of which can be, for example, a switching valve of a hydraulic supply of the lifting means, etc. Preferably, the controlled updating takes place automatically and in an independently controlled manner by the control unit. A semi-automatic operating mode can also be provided, in which the control unit first signals to the driver that an "updating" is necessary if the target longitudinal inclination is to be maintained, but this is only actually carried out when the operator starts the updating, in particular by manual control command.

Step c) can preferably be carried out depending on the limit value. This means that not every slightest deviation between the actual longitudinal inclination value and the target longitudinal inclination value initiates an adaptation of the lift adjustment or an execution of a lift adjustment. Preferably, a controlled updating can only be started when a difference limit value between the target longitudinal inclination and the actual longitudinal inclination is exceeded. The difference limit value can be specified manually or can be fixed in the control unit, for example ex factory. Additionally or alternatively, the controlled updating can take place in a time-dependent manner only after a fixed time interval has elapsed. The length of the time interval can also be predefined manually or be can defined in a fixed manner in the control unit, for example ex factory.

A further development of the method according to the invention provides that the time interval is dynamically adapted by the control unit in such a way that the length of the time interval decreases with increasing difference limit values and vice versa. The more striking the deviation is between the actual longitudinal inclination and the target longitudinal inclination, the shorter the time interval should be. In addition, further limit values can be defined here for the time and/or the difference between the actual and target longitudinal inclination for dynamic adaptation; if these are exceeded and/or undershot, for example, no time element and/or no difference element is provided between the actual longitudinal slope and the target longitudinal slope.

It can be additionally or alternatively provided that the currently determined longitudinal inclination of the machine frame is displayed to the driver and/or is used by the control unit to determine whether the machine is currently travelling on a horizontally running surface, uphill or downhill. The latter can also be done, for example, in combination with a comparison of the longitudinal inclination of the machine frame with the course of the ground surface in the forward direction of the machine. It can also be provided that a change in the currently determined longitudinal inclination of the machine frame and/or a current difference from a fixed longitudinal inclination is displayed and/or is used by the control unit to set one or more lifting positions of the lifting means. This can be used, for example, to detect driving into an incline or down a slope and/or driving over a milling edge.

Further additionally or alternatively, it is preferred if at least one longitudinal inclination limit value is defined, which defines and limits a maximum/minimum longitudinal inclination of the machine frame in the forward direction. This can be useful, for example, if the machine is operated on a slope or incline in the forward direction. The greater the angle of the slope/incline with respect to a virtual horizontal to the plumb-line direction, the greater the differences must be in the setting positions of the front and/or rear lifting means in order to maintain the actual longitudinal inclination of the machine frame. However, in order to still have a travel reserve available even in extreme positions of the machine, it is advantageous if the control system prevents any further updating of the front and/or rear lifting means depending on the actual longitudinal inclination when certain maximum/minimum longitudinal inclination positions of the machine frame are reached.

During operation of ground milling machines of the type in question, it is known that so-called levelling devices are used to control the current milling depth. For this purpose, use can be made, for example, of travel sensors, in particular on one or more side plates, and/or, for example, contactless distance sensors, such as ultrasonic or laser sensors and/or one or more cameras for optical distance determination, with which the current milling depth can be determined and monitored, for example, by determining the relative lift position of the side plate(s) relative to the machine frame. It is now preferred that the method according to the invention for setting the lift position of at least one lifting means as a function of the longitudinal inclination of the machine frame in the forward direction is designed in such a way that, in the event of an intervention in this method by way of open-loop or closed-loop control, such a levelling control is overridden. If a controlled updating of the lift position of rear or front lifting means is carried out by the control unit to adapt the actual longitudinal inclination to the target longitudinal inclination, control interventions on one, several or all lifting means by the levelling device are thus simultaneously not permitted or are prevented. In this respect, this control is thus given priority over the levelling control.

In addition to the above method steps according to the invention, it can be provided that the weight force distribution on the lifting means, in particular the lifting columns, is determined, as disclosed for example in DE102014019168A1. This further development also makes it possible, in particular, to draw conclusions about the course of the ground surface at the same time. In addition, such an arrangement also allows additional or alternative statements about the current transverse inclination of the machine.

It is known that ground milling machines of the type in question comprise a so-called loading conveyor belt, with the aid of which the milled material produced in the milling process can be transferred to a transport vehicle, for example. Conveyor belts of this type are described, inter alia, in documents DE102006062129A1, DE102005044211A1, EP1855899B1, EP2722441B1 and DE 102014019168A1. In order to be able to realize different discharge heights, it is known to mount such a conveyor belt on the machine frame so as to be pivotable about a horizontal axis, in particular one running transversely to the forward direction. A mounting that enables pivoting about a vertical axis is also known. For the method according to the invention, it is now preferred if, in particular, the height position of the discharge point of the height-adjustable conveyor belt is updated in such a way that, in the event of a change in the actual longitudinal inclination of the machine frame, the lifting position of the conveyor belt is counter-regulated in such a way that the discharge point maintains substantially the same distance from the ground surface. If, for example, the rear lifting means are extended because the machine enters an incline, the discharge point of the conveyor belt, which usually protrudes forwards from the machine, is lowered. It is then advantageous if the control unit then simultaneously controls an adjustment movement of the lift adjustment of the conveyor belt in such a way that the discharge point is raised again to its original height. Here, too, it is possible to define limit values that must be exceeded or undershot to trigger an adjustment movement of the conveyor belt.

Ground milling machines are known in which, for example, only the front or only the rear movement means are connected via lifting means to the machine frame. However, the invention relates very particularly to ground milling machines in which all front and rear movement means are each connected to the machine frame via a lifting means. For such ground milling machines in particular, it is advantageous if the controlled updating of the lift position by the control unit is carried out exclusively in respect of the lifting means of the front or rear movement means. This means that the readjustment of the actual longitudinal inclination in the control process is thus carried out exclusively only by control of the lifting means of the front or rear lifting means by the control unit. In particular for ground milling machines with such a basic structure, it is now further preferred if the front or rear lifting means, which are updated in controlled fashion by the control unit in step c), are coupled to each other in an oscillating manner with regard to their individual lift position. An oscillating coupling is present when an extension movement of one lifting means results in an opposing retraction movement of the lifting means arranged on the other side of the machine. Such a pendulum bearing is known in the prior art and can be achieved, for example, by means of a hydraulic forced coupling or also by means of a mechanical coupling.

It is optimal if the controlled updating in step c), for example, takes place exclusively on the basis of a longitudinal inclination detection of the machine frame relative to the plumb-line direction. This enables a simple and at the same time efficient overall design of the system. It is particularly advantageous, additionally or alternatively, if the controlled updating takes place without reference to the ground surface. This means that changes in the course of the ground contact plane trigger changes in the actual longitudinal inclination and thus initiate a readjustment process, even if the relative position of the machine frame would remain unchanged per se. This can occur, for example, in particular with changing incline ratios of the ground contact plane. In this case, the control unit thus controls the longitudinal inclination of the machine frame in such a way that it remains substantially constant with respect to the plumb-line direction and changes with respect to the current ground contact plane during continued travel. Further additionally or alternatively, the controlled updating is preferably exclusively gravity-dependent and/or dependent on the direction of gravity.

Lastly, it can be provided that the predefining of a target longitudinal inclination of the machine frame in step b) is carried out manually. The operator can thus define an individual target longitudinal inclination that is comfortable for him, for example, by the operator first setting a longitudinal inclination and then defining the current longitudinal inclination as the target longitudinal inclination. Additionally or alternatively, it can be provided that the target longitudinal inclination definable by the operator must lie within a predefined permissible target longitudinal inclination range, which can be checked accordingly by the control unit when defining the target longitudinal inclination. The permissible target longitudinal inclination range can be defined in such a way that, starting from this, longitudinal inclination changes by the control unit are still possible in both directions, i.e. towards larger and towards smaller actual longitudinal inclinations. Additionally or alternatively, the permissible target longitudinal inclination range can vary depending on the current actual longitudinal inclination, in particular with regard to position and/or extent.

The method according to the invention can be combined with other open-loop and closed-loop control methods. For example, a transverse incline control system, which works in particular analogously to the above longitudinal incline control system, can be provided and/or a levelling function or milling depth control system. Assistance functions, such as an automatic plunge and/or lift, a milling drum box change mode, a transport mode, etc. can also be integrated into the longitudinal incline control system described above and/or can be controlled in such a way that simultaneous modes are excluded.

The invention also relates to a ground milling machine, in particular a road milling machine, very particularly a rear-rotor milling machine or a center-rotor milling machine, comprising a machine frame, ground milling means, and front and rear movement means, wherein at least the front or rear movement means, and in particular all movement means, are connected to the machine frame in a vertically adjustable manner by means of height-adjustable lifting means each having an actuator. The ground milling machine further comprises a drive device for driving the actuators of the lifting means and a control device which is designed to control the lifting adjustment of the lifting means by the actuators. It is now essential that the ground milling machine further comprises a longitudinal inclination sensor for determining the longitudinal inclination of the machine frame with respect to a plumb-line direction, and that a control unit is present which is designed in such a way that it controls the lift adjustment of the lifting means as a function of a longitudinal inclination change of the machine frame. As is known, the plumb-line direction denotes in particular the local direction of the acceleration due to gravity. The reference plane for determining the longitudinal inclination is thus a virtual reference plane running in the longitudinal direction or forward direction of the ground milling machine and in the vertical direction. The reference beam for determining the angle of the longitudinal inclination is the plumb-line direction and a reference beam defined in a stationary manner relative to the machine frame, which reference beam extends at least partially in or against the longitudinal direction or the forward direction of the ground milling machine. It is understood that the longitudinal inclination can be defined absolutely more or less arbitrarily to the extent mentioned above. However, this is not important in the present case. What is fundamental is the deviation of the actual longitudinal inclination from the defined target longitudinal inclination.

The specific embodiment of the longitudinal inclination sensor can vary. What is fundamental is that it should be designed to determine the plumb-line direction and a reference longitudinal inclination of the machine frame. The longitudinal inclination sensor can, for example, be a capacitive, magnetostrictive, electronic, inductive and/or optical inclination sensor and/or a gyroscope sensor.

It is additionally or alternatively advantageous if the longitudinal inclination sensor is mounted in a vibration-damped manner on the machine frame or on a vibration-damped driving stand. Such vibration damping can be achieved, for example, by means of suitable rubber buffers, etc.

Additionally or alternatively, more than one longitudinal inclination sensor can also be provided, for example in a paired arrangement on both sides to the right and left of the machine and/or in the longitudinal direction of the ground milling machine one behind the other, preferably in the front and the rear half of the ground milling machine and/or in the region or, viewed horizontally, at the level of the driver's cab and/or at the level of the ground milling unit.

The longitudinal inclination sensor is furthermore additionally or alternatively preferably arranged directly on the machine frame of the ground milling machine or on a component fixed thereto.

It can be provided that the sensor data determined via the at least one longitudinal inclination sensor is not only used to determine the longitudinal inclination of the machine frame in relation to the gravitational field, but that further information is derived from the obtained sensor data. For example, it is possible to use the sensor data to determine the rotational frequency of the milling drum, etc. In these cases, the longitudinal inclination sensor thus fulfils a dual function.

It can also be provided that at least one further longitudinal inclination sensor is arranged on one of the movement means, such as a crawler track. In combination with the longitudinal inclination information regarding the longitudinal inclination of the machine frame, further operating situations can be identified, such as driving over ground obstacles, etc.

Obviously, it is preferred if the ground milling machine, and in particular the control unit, are designed to carry out the method according to the invention. For this purpose, it is particularly preferred if an additional actuating element is present in the region of the driver's cab, through the actuation of which the operator can define the current actual longitudinal inclination position of the machine frame as the target longitudinal inclination.

BRIEF DESCRIPTION OF THE DRAWINGS

The invention will be described in more detail below with reference to the exemplary embodiments shown in the figures, which show schematically.

DETAILED DESCRIPTION

Like components are denoted in the figures with like reference signs, wherein not every repeating component is marked separately in the figures.

Figure 1:
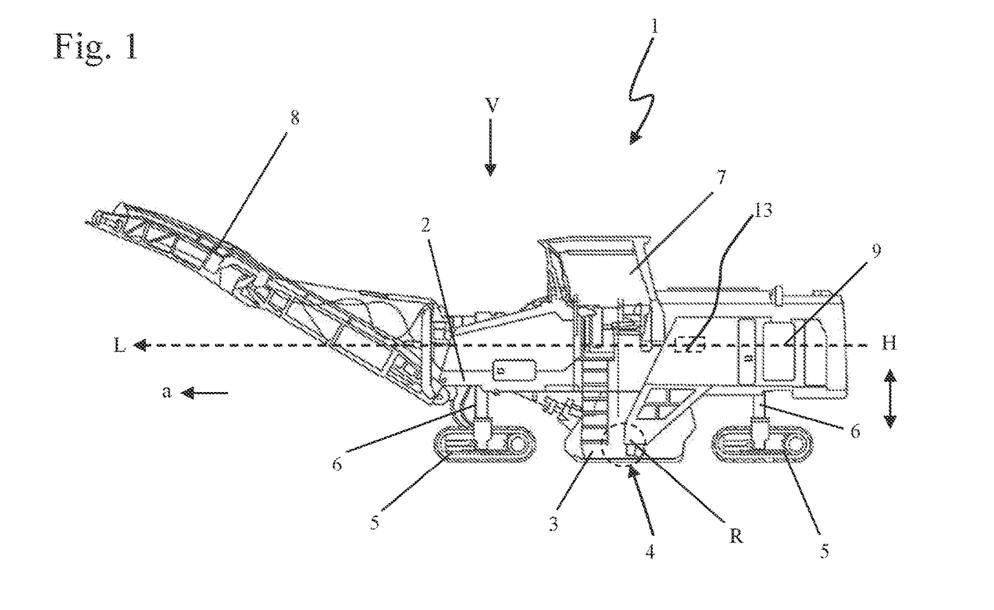
FIG. 1 a side view of a ground milling machine.

FIG. 1 illustrates a construction machine of the type in question, specifically a cold road milling machine 1. Essential elements of the road milling machine 1 are a machine frame 2, which defines the rigid, basic supporting structure of the road milling machine 1, a milling drum 4 (indicated by a dashed line) arranged in a milling drum box 3, movement means 5, specifically for example crawler tracks, which are connected to the machine frame 2 via lifting means, in the present case for example in the form of vertically adjustable lifting columns 6, and which carry the ground milling machine 1, a drive device 9, in particular an internal combustion engine, and a driver's cab 7. The lifting means are adjustable in the height direction H, i.e. in the direction of their longitudinal axis. Furthermore, one or more conveying devices can be provided, for example a front loading conveyor belt 8. In working operation, the ground milling machine 1 travels in the working direction a under its own drive in the forward direction over the ground surface to be milled up, wherein the milling drum 4 rotates about an axis of rotation R running horizontally and transversely to the working direction and plunges into the ground surface and mills up the ground surface using milling tools, not specified in more detail, in a manner known per se in the prior art.

Figure 2:
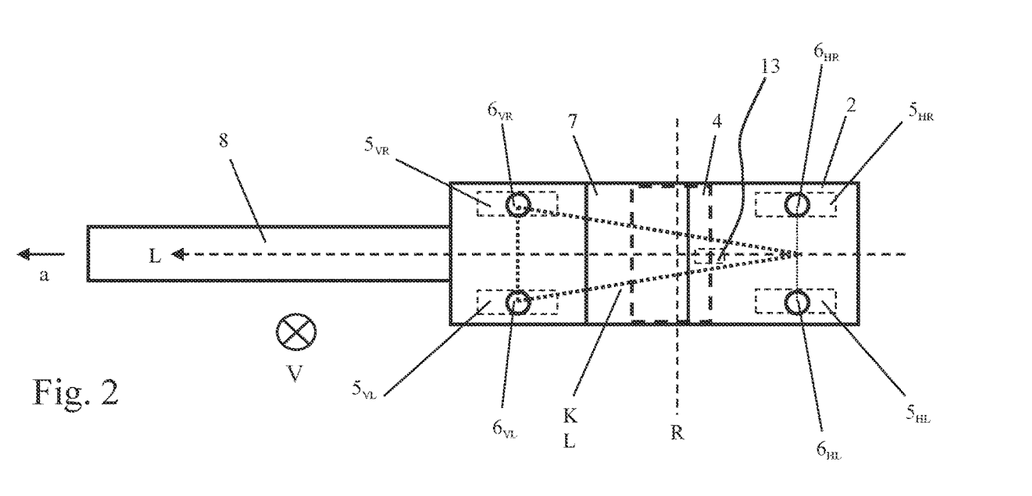
FIG. 2 a plan view of the ground milling machine according to FIG. 1.

FIG. 2 illustrates the basic structure of the ground milling machine 1 in a schematic plan view. Accordingly, the ground milling machine 1 as a whole comprises a pair of front movement means $5_{VR}$ and $5_{VL}$, which are connected to the machine frame 2 via one each of the lifting columns $6_{VR}$ and $6_{VL}$. There is also a pair of rear movement means $5_{HR}$ and $5_{HL}$ connected to the machine frame via the lifting columns $6_{HR}$ and $6_{HL}$. Here, "H" and "V" denote the arrangement in the forward direction a of the ground milling machine 1 and designate the "rear" and "front" respectively, "R" and "L" denote the side of the ground milling machine 1 as seen in the forward direction and designate the "right" and "left" respectively.

FIGS. 1 and 2 also show the longitudinal axis L of the ground milling machine 1. This corresponds to the longitudinal extension of the ground milling machine 1 in the forward direction and parallel to the ground surface.

During working operation of the ground milling machine 1, two fundamental challenges arise for the machine operator with regard to the positional stability of the ground milling machine 1. On the one hand, it is desired to mill up the ground surface at a predefined and controlled milling depth ("levelling"), for example, in order to ensure sufficient surface removal and to avoid damaging deeper layers of the roadbed as applicable. On the other hand, due to their high center of gravity, such ground milling machines tend to tip over comparatively quickly, especially when driving over ground obstacles, such as milling edges. In order to increase the tipping stability of these ground milling machines 1, a so-called "oscillation" is therefore provided which, in the sense of a pendulum axis, provides for the counter-rotating height compensation of the pair of front movement means $5_{VR}$ and $5_{VL}$ and rear movement means $5_{HR}$ and $5_{HL}$ and left movement means $5_{VL}$ and $5_{HL}$ and right movement means $5_{VR}$ and $5_{HR}$ and thus at least partially compensates for unevenness of the ground towards the machine frame 2. The lifting means 6 are designed to be height-adjustable for this purpose. To this end, each lifting means 6 can, for example, have an actuator 10 in the form of a double-acting hydraulic cylinder, the design and mode of operation of which is shown in more detail in FIG. 4 as a matter of precaution, but is also known in the prior art. The two rear lifting means can be/become coupled to each other, for example hydraulically or electronically, in a temporarily oscillating manner, in order to realize a 3-fold pendulum movement. For this purpose, the tilting lines KL are shown in FIG. 2.

As will be described further below, the present system makes it possible to control the lift adjustment of the front or rear lifting means depending on an actual longitudinal inclination value of the machine frame 2 with respect to a plumb-line direction V. For determining an actual longitudinal inclination value, the ground milling machine 1 has a longitudinal inclination sensor 13. This is for determining the current inclination of the longitudinal inclination sensor 13 present direction of gravity acceleration. The longitudinal inclination W is thus determined in a virtual reference plane, which is defined by the longitudinal extension L of the ground milling machine 1 in the forward or working direction A and by the plumb-line direction V. The determination of the position of the machine frame 2 in this virtual reference plane relative to the plumb-line direction V and the change in this position are relevant for the system. In the present case, it is not necessarily a matter of determining an absolute angle, but rather a change in the actual longitudinal inclination relative to a target longitudinal inclination. For this purpose, the actual inclination angle can be determined along a reference beam which extends in the virtual reference plane and runs, for example, parallel to the longitudinal extension of the machine frame or perpendicularly thereto. The longitudinal inclination sensor 13 can be mounted directly on the machine frame 2 or also positioned in the driver's cab 7, for example.

Figure 3:
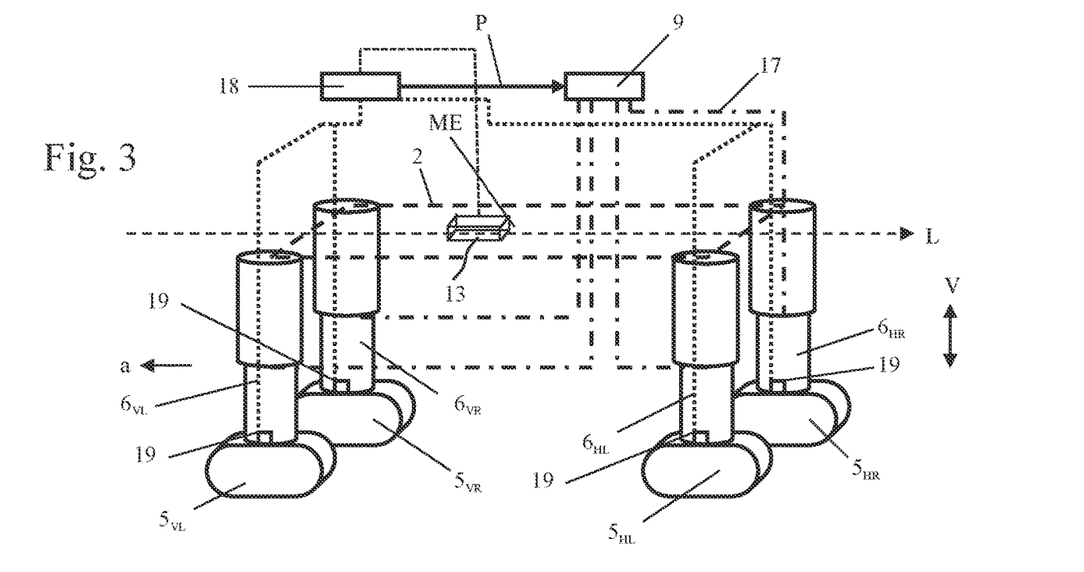
FIG. 3 a schematic representation of the structure of a control system.

FIG. 3 illustrates a possible overall structure of the lifting system by which the machine frame is connected to the movement means 5. The machine frame 2 is shown here by dashed lines in a machine frame plane ME, which runs parallel to the longitudinal extension and which in the present example runs parallel to the horizontal ground surface. The drive device 9 is provided to drive the height adjustment and may be, for example, an internal combustion engine that drives a hydraulic pump of a corresponding hydraulic supply system. For this purpose, the drive device 9 can be fluidically connected to each of the actuators 10 of the lifting means 6, which are designed as hydraulic cylinders, via corresponding hydraulic lines 17 (dot-and-dash lines). The coordination of the actuating movement of the actuators 10 and thus of the lifting columns 6 is achieved via a control unit 18, which is connected to the longitudinal inclination sensor 13 arranged in a stationary manner relative to the machine frame. Furthermore, displacement and/or pressure and/or weight sensors 19 can be provided on the individual lifting means 19.

Figure 4:
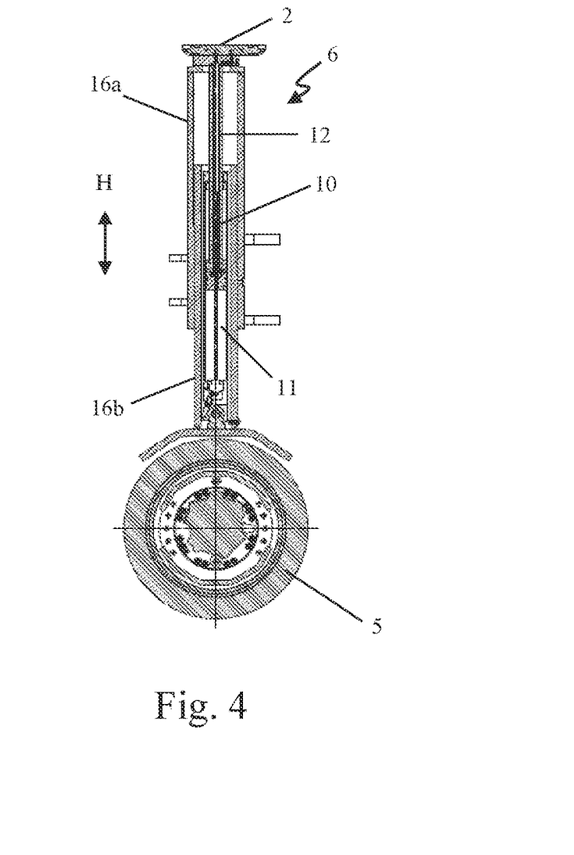
FIG. 4 a schematic sectional view of a lifting means with movement means.

The basic construction of possible lifting means is shown as an example in FIG. 4. FIG. 4 is a longitudinal sectional view through a lifting column 6 in the vertical direction along its central longitudinal axis. The essential element of each lifting column 6 is in particular an actuator 10, via which the adjustment force is applied. In the specific exemplary embodiment, the actuator 10 is a hydraulic cylinder-piston unit with a hydraulic cylinder 11 and a piston 12. For linear guidance, a pair of outer sleeves 16a, 16b is provided in a manner known per se, which shields the cylinder-piston unit from the outside.

Figure 5:
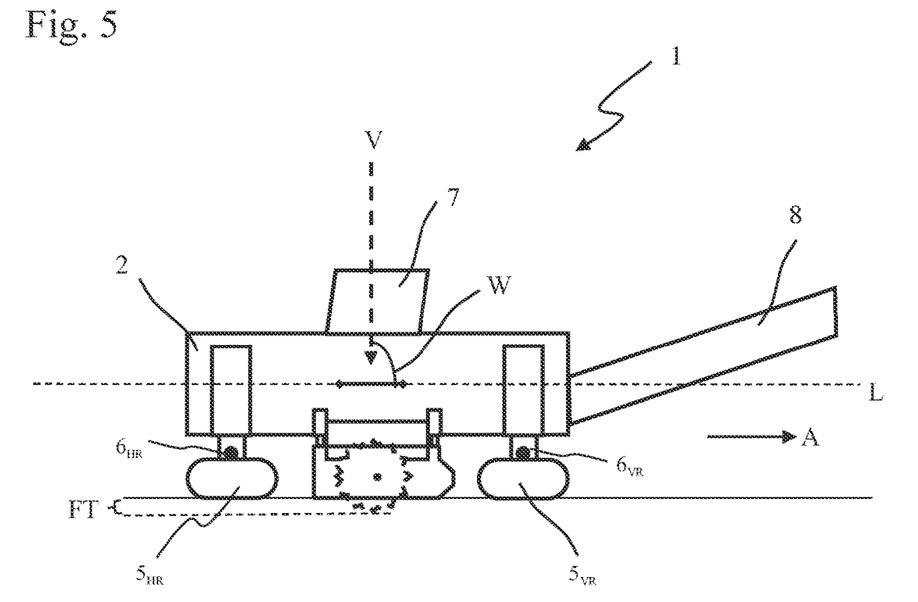
FIG. 5 a side view of a ground milling machine on a horizontal surface.
Figure 6:
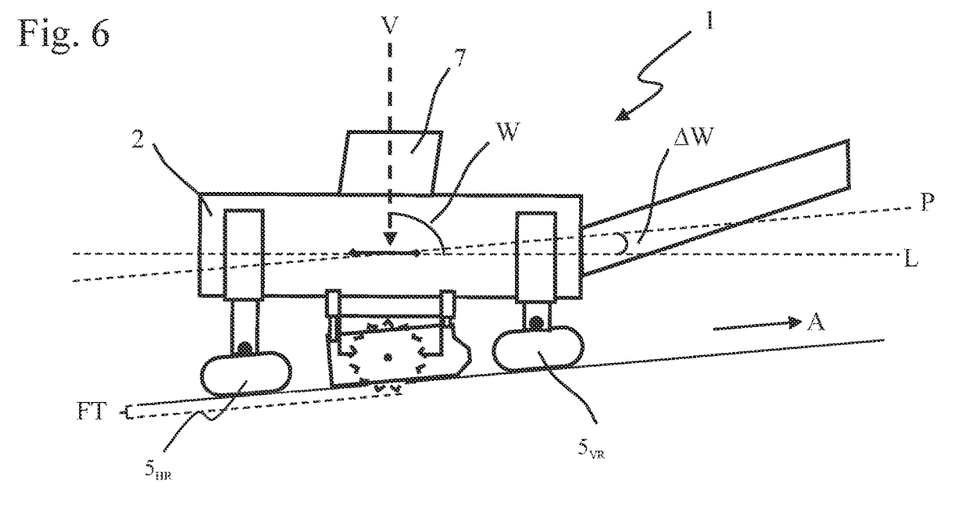
FIG. 6 a side view of a ground milling machine on a slope.

In the present case, the control unit 18 is designed to control in particular the lift position of the rear lifting means as a function of the actual longitudinal inclination towards a defined target longitudinal inclination. FIG. 5 shows an initial position of the ground milling machine 1, in which it stands on a horizontal ground surface and is in contact with the ground at a milling depth FT. In this case, the standing plane of the ground milling machine 1 is thus perpendicular to the plumb-line direction V. If the ground milling machine 1 moves out of the position in FIG. 5 into an incline, as indicated in FIG. 6, this is detected by the longitudinal inclination sensor 13 by a change in the actual longitudinal inclination of the machine frame 2. This results in a deviation of the actual longitudinal inclination from the target longitudinal inclination and the control unit 18 initiates a readjustment process in which the rear lifting means in the present case are extended and the machine frame thus resumes a horizontal position. The longitudinal axis of the machine frame is then no longer parallel to the ground, but still perpendicular to the plumb-line direction V.

FIGS. 5 and 6 first show the angle W, which indicates the longitudinal angle of inclination between the plumb-line direction V and an angle leg running perpendicularly thereto in the horizontal plane in the direction of the working direction A. The angle W is a 90° angle in the present case. In FIG. 6, AW indicates the deviation of a parallel line P, running parallel to the ground in the virtual reference plane defined by the plumb-line direction V and machine longitudinal direction L, from the longitudinal direction L the machine frame 2 in this plane.

A comparison of FIGS. 5 and 6 shows here that if only the lift adjustment of the lifting means is controlled, for example only at the rear, the milling depth varies with changing inclines in the terrain. In order to counteract this, it can be provided that the driver, for example manually, readjusts the milling depth and/or a levelling system monitors and adjusts the desired milling depth. For this purpose, it can be provided, for example, that such a levelling system then uses stroke path sensors that are located on side plates of the milling drum box or are implemented in corresponding lifting means for the side plates in a manner known per se. However, it is preferred that such a levelling system is temporarily switched off if the aforementioned adaptation of the longitudinal inclination of the machine frame towards the actual longitudinal inclination is carried out by the control unit 13.

Figure 7:
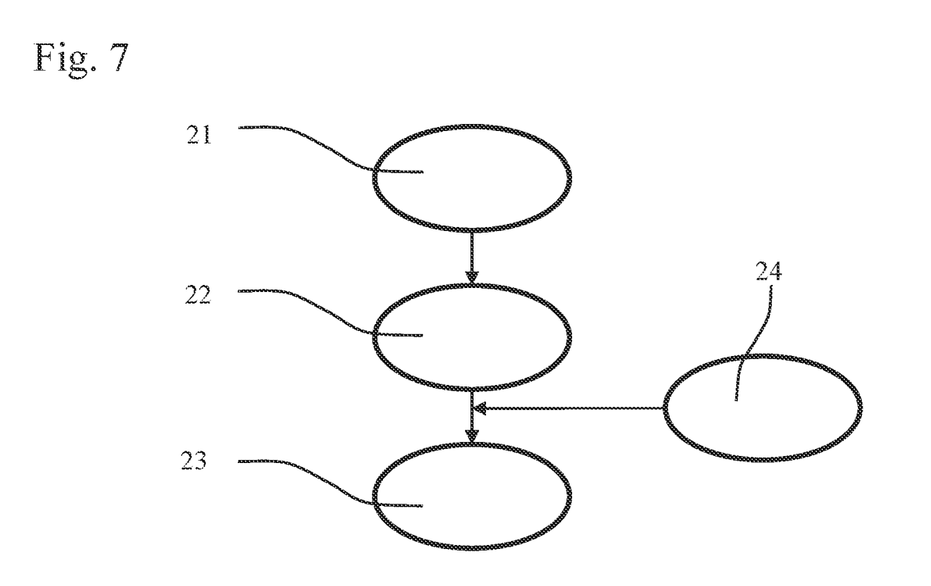
FIG. 7 a flow chart of a method according to the invention.

Lastly, FIG. 7 illustrates the basic sequence of a possible control method. In step 21, the actual longitudinal inclination of the machine frame is first determined and monitored. In parallel, beforehand or subsequently, a target longitudinal inclination can be defined in step 22. If driving operation is now started, for example, the determination and monitoring of the actual longitudinal inclination according to step 1 continues to run in the background, wherein if the actual longitudinal inclination deviates from the target longitudinal inclination, it is provided in step 23 that a controlled updating of the lift position of the lifting means, in this case for example the rear lifting means, is carried out by the control unit. The readjustment is performed in such a way that the actual longitudinal inclination is approximated to the target longitudinal inclination of the machine frame by the lift adjustment of the rear lifting means. It can be provided that, during these phases of adjustment of the actual longitudinal inclination, interventions of a levelling system for setting the milling depth are prevented.

A functionally upstream step 24 can be provided as a trigger threshold for step 23 and monitors whether the deviation of the actual longitudinal inclination from the target longitudinal inclination exceeds a defined limit value and/or a time interval. Only when the limit value is exceeded is a readjustment carried out.

What is claimed is:

1. A method of operating a ground milling machine, comprising a machine frame connected via lifting means to movement means, the method comprising the steps of:
   a) detecting and monitoring an actual longitudinal inclination of the machine frame relative to a plumb-line direction with at least one longitudinal inclination sensor and transmitting the actual longitudinal inclination of the machine frame to a control unit;
   b) defining a target longitudinal inclination of the machine frame;
   c) then, if the actual longitudinal inclination deviates from the target longitudinal inclination, updating a lifting position of the lifting means in a controlled manner by the control unit, such that the actual longitudinal inclination is approximated to the target longitudinal inclination of the machine frame;

d) upon the actual longitudinal inclination being approximated to the target longitudinal inclination, updating a height position of a discharge point of a height-adjustable conveyor belt of the ground milling machine in a controlled manner by the control unit; and wherein step c) is carried out depending on a limit value, such that a controlled updating is only performed
 if a difference limit value between the target longitudinal inclination and the actual longitudinal inclination is exceeded; and/or
 time-dependently after a fixed time interval.

2. The method according to claim 1, wherein the time interval is dynamically adapted by the control unit such that a length of the time interval decreases as the difference limit values increase, and vice versa.

3. The method according to claim 1, wherein the movement means comprise front and rear movement means and the lifting means comprise front and rear lifting means, and the front and rear movement means are each connected to the machine frame via the front and rear lifting means, respectively, and
 wherein the controlled updating of the lift position by the control unit is carried out exclusively in respect of the front or rear lifting means of the front or rear movement means.

4. The method according to claim 3, wherein the front or rear lifting means, which are updated in a controlled manner by the control unit in step c), are coupled to one another in an oscillating manner with respect to their individual lift position.

5. The method according to claim 1, wherein the controlled updating in step c) is performed:
 exclusively on a basis of a longitudinal inclination detection of the machine frame in relation to the plumb-line direction;
 reference-free in relation to a ground surface; and/or
 exclusively gravity-dependently.

6. The method according to claim 1, wherein the target longitudinal inclination of the machine frame is predefined manually in step b), in particular within a predefined permissible target longitudinal inclination range.

7. A ground milling machine, comprising:
 a machine frame,
 a ground milling means,
 front movement means and rear movement means, wherein at least the front movement means or the rear movement means are connected to the machine frame in a height-adjustable manner via vertically adjustable lifting means each with an actuator;
 a height-adjustable conveyor belt;
 a drive device for driving the actuators of the lifting means;
 a control device configured to control lift adjustment of the lifting means by the actuators,
 wherein the control device comprises at least one longitudinal inclination sensor to determine a longitudinal inclination of the machine frame with respect to a plumb-line direction, and a control unit configured such that the control unit controls a lift adjustment of the lifting means as a function of a longitudinal inclination change of the machine frame and a height adjustment of a discharge point of the height-adjustable conveyor belt of the ground milling machine in response to the longitudinal inclination change of the machine frame, provided the longitudinal inclination change exceeds a defined limit value and/or defined time interval.

8. The ground milling machine according to claim 7, wherein the longitudinal inclination sensor is at least one of:
 a capacitive, magnetostrictive, electronic, inductive and/or optical inclination sensor or a gyroscope sensor;
 mounted on the machine frame in a vibration-damped manner;
 arranged at a level of a driver's cab and/or at a level of the ground milling unit, as seen in a horizontal plane.

9. The ground milling machine according to claim 7, wherein the ground milling machine is operable to operate as follows:
 a) detecting and monitoring an actual longitudinal inclination of the machine frame relative to the plumb-line direction with the at least one longitudinal inclination sensor and transmitting the actual longitudinal inclination of the machine frame to the control unit;
 b) defining a target longitudinal inclination of the machine frame;
 c) then, if the actual longitudinal inclination deviates from the target longitudinal inclination, updating a lifting position of the lifting means in a controlled manner by the control unit, such that the actual longitudinal inclination is approximated to the target longitudinal inclination of the machine frame.

10. The ground milling machine according to claim 7, wherein the ground milling machine is a road milling machine.

11. The ground milling machine according to claim 7, wherein the control unit controls the height adjustment of the discharge point of the height-adjustable conveyor belt of the ground milling machine in response to the longitudinal inclination change of the machine frame such that the discharge point maintains substantially a same distance from a ground surface.

12. The method according to claim 1, wherein updating the height position of the discharge point of the height-adjustable conveyor belt of the ground milling machine in a controlled manner by the control unit is performed such that the discharge point maintains substantially a same distance from a ground surface.

* * * * *